United States Patent Office 3,707,485
Patented Dec. 26, 1972

3,707,485
2-(5-NITRO-FURYL-2)-5-AMINOETHOXY PYRIMIDINES
Klaus Gutsche, Rudolf Albrecht, Hans-Joachim Kebler, and Eberhard Schroder, Berlin, Germany, assignors to Schering Aktiengesellschaft, Berlin, Germany
No Drawing. Filed July 16, 1970, Ser. No. 55,601
Claims priority, application Germany, July 19, 1969, P 19 37 629.5
Int. Cl. C07d 51/38
U.S. Cl. 260—256.4 C
33 Claims

ABSTRACT OF THE DISCLOSURE

Nitrofuryl-aminoalkoxy-pyrimidines of the formula

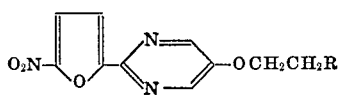

wherein R is a tertiary amino group and the corresponding quaternary ammonium salts have good activity against both *Trichomonas vaginalis* and *Candida albicans*.

BACKGROUND OF THE INVENTION

This invention relates to novel nitrofuryl-aminoalkoxy-pyrimidines.

Belgian Pat. No. 716,946 claims compounds of the formula

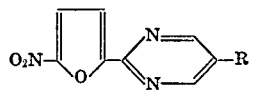

wherein R can represent, for example, an alkoxy residue of 1–6 carbon atoms. These compounds are effective against bacteria and trichomonades.

SUMMARY OF THE INVENTION

This invention relates to compounds of the formula

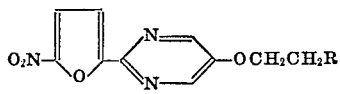

I wherein R represents a tertiary amino group as defined hereinafter, both in free base form and in the form of acid addition salts, and quaternary ammonium salts thereof and to their use.

DETAILED DISCUSSION

In the compounds of Formula I, R can be dialkylamino containing 1–5 carbon atoms, inclusive, in each alkyl group. pyrrolidino, piperidino, hexamethylenimino, piperazino, morpholino, and the corresponding amino groups substituted by one, two or more of alkyl, hydroxy, acyloxy, acyl, hydroxyalkyl and acyloxyalkoyl wherein the alkyl and acyl groups each contain 1–5 carbon atoms, inclusive, and the above cyclic amino groups bridged by a —(CH$_2$)$_2$— group.

Examples of dialkylamino are dimethylamino, diethylamino, methylethylamino, di-n-propylamino, methyl isopropylamino, and the like. The cyclic amino groups can be unsubstituted or ring substituted by one or more of the groups named above, preferably alkyl and especially methyl in the case of pyrrolidino, piperidino, hexamethylenimino and morpholino, e.g., 2-methylpyrrolidino, 4-methylpiperidino, 2,4,6-trimethylhexamethylenimino, and the like. When R is substituted piperazino, the substituent is preferably at the 4-position, e.g., N'-methyl, ethyl, hydroxyethyl, β-acyloxyethyl or β-acyloxypropyl, e.g., wherein the acyl group is acetyl, propionyl, n-butyryl, or trimethylacetyl.

As stated above, the cyclic groups can have a bridging (CH$_2$)$_2$ group which forms a bicyclic heterocyclic amino group. For example, the hexamethylenimino group can be bridged at, e.g., the 3- and 6-position carbon atoms to form a 3-azabicyclo[3.2.2]-nonan-3-yl group; pyrrolidino can be bridged, e.g., at the 3- and 4-position carbon atoms to form a 3-azabicyclo[3.2.0]heptan-3-yl group or at the 2- and 5-position carbon atoms to form a 7-azabicyclo[2.2.1]heptan-7-yl group; and piperidino can be bridged at the 3- and 5-position carbon atoms to form a 3-azabicyclo[3.2.1]octan-3-yl group or at the 2- and 4-position carbon atoms to form a 2-azabicyclo[2.2.2]octan-3-yl group.

This invention embraces compounds of Formula I both in free base form and in the form of an acid addition salt with a physiologically compatible acid. Examples of physiologically acceptable acids are hydrochloric acid, sulfuric acid, phosphoric acid, acetic acid, propionic acid, lactic acid, succinic acid, tartaric acid, citric acid, benzoic acid, salicyclic acid, nicotinic, acid, and heptagluconic acid.

Other pharmaceutically acceptable acid addition salts, i.e., of acids which do not materially increase the toxicity of the compounds of this invention, include salts of other mineral acids, such as, for example, hydriodic, hydrobromic, metaphosphoric and nitric as well as salts of organic acids such as, for example, malic, glycolic, gluconic and arylsulfonic, e.g., p-toluene sulfonic acids.

The acid addition salts of this invention are not limited to those formed with pharmaceutically acceptable acids. Other acids, e.g., those formed with perchloric and other toxic and/or unstable acids are useful for isolation, characterization and purification of the free base. These acid addition salts can, if desired, thereafter be converted back to the free base and acid addition salts of pharmaceutically acceptable acids, employing conventional procedures.

The compounds of this invention include the quaternary ammonium salts of the tertiary amines of Formula I, viz, those otherwise corresponding to Formula I wherein R' is ±AmX⁻ in which ±Am is a quarternary ammonium group corresponding to R' but bearing an additional alkyl, aryl or aralkyl group on the amino nitrogen atom and X is an acidic anion, e.g., chloro, bromo, iodo or sulfato. Examples of such quaternary ammonium salts are the methobromide, methochloride, methiodide, ethiodide, ethochloride, benzyl chloride, dodecyl chloride, bis-hexamethylene dichloride, and the like.

The free bases of Formula I can be converted into quaternary salts thereof by reaction with an alkyl halide, a dialkyl sulfate, or an alkyl sulfonate, preferably wherein the alkyl group contains from 1–5 carbon atoms, inclusive, e.g., methyl or ethyl.

The compounds of this invention can be prepared by nitrating compounds of the formula

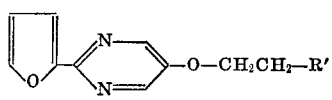

wherein R' is a dialkylamino group in which each alkyl group contains 1–5 carbon atoms, inclusive, pyrrolidino, piperidino, hexamethylenimino, piperazino, morpholino group and the corresponding groups substituted by one, two or more of alkyl, acyloxy, acyl, and acyloxyalkyl wherein the alkyl and acyl groups each contain 1–5 carbon atoms, inclusive, and the above cyclic amino groups bridged by a $(CH_2)_2$-group, and thereafter, if desired, transesterifying or saponifying an ester group thereof; converting a free base into an acid addition salt thereof with an acid, preferably a physiologically acceptable acid; converting an acid addition salt thereof into the corresponding free base; and/or quaternizing a free base into a corresponding quaternary ammonium salt thereof.

The starting compounds (II) can be produced from a reactive ester of 2-(2-furyl)-5-(2-hydroxyethoxy)-pyrimidine, prepared in accordance with the process described in Belgian Pat. No. 716,946, e.g., the p-toluenesulfonic acid ester, or 2-(2-furyl)-5-(2-chloroethoxy)-pyrimidine, also described in Belgian Pat. No. 716,946, by heating with a secondary amine (R'–H where R' has the values given above).

The compounds of Formula II can be isolated by conventional procedures in free base form, or, for purification purposes, as a readily crystallizable acid addition salt, such as, for example, hydrochloride.

Compounds of Formula II are nitrated by introducing them in the form of the free base, or a salt into a nitrating reaction mixture, such as, for example, nitric acid/sulfuric acid or nitric acid/acetic anhydride. Compounds of Formula I can be isolated from the nitrating reaction mixture as the free base or the salt. The free bases can thereafter be converted subsequently into the corresponding salt by reaction with a physiologically compatible acid.

In the nitration reaction, compounds of Formula I which contain a free hydroxy group are first acylated by reaction in the usual manner with an acid anhydride or acid halogenide, e.g., acetic anhydride or acetyl chloride.

The structure of the compounds of this invention is confirmed by elementary analysis and physical measurements, such as IR and NMR spectroscopy, or titrations.

The novel compounds are highly effective against *Trichomonas vaginalis,* as can be seen from Table I. For comparison purposes, the commercially available metronidazole and a compound of Belgian Pat. No. 716,946 are set forth. It is of special significance that compounds of this invention exhibit, in addition to activity against *Trichomonas vaginalis,* activity against *Candida albicans* because infections with *Trichomonas vaginalis* in many cases involve mixed infections with *Candida albicans*. An effect against *Candida albicans* is absent in the comparison compound metronidazole.

TABLE I

| Compound | MIC [1] against— | |
|---|---|---|
| | *Trichomonas vaginalis* (µg./ml.) in the tube test | *Candida albicans* (µg./ml.) in the flake [lamina] test |
| Metronidazole | 1.56 | ([2]) |
| 2-(5-nitro-2-furyl)-5-n-butoxypyrimidine (Belgian Pat. No. 716,946) | 1.56 | ([2]) |
| 2-(5-nitro-2-furyl)-5-(2-pyrrolidinoethoxy)-pyrimidine | 0.39 | 200 |
| 2-(5-nitro-2-furyl)-5-(2-dimethylamino-ethoxy)-pyrimidine | 0.39 | 100 |
| 2-(5-nitro-2-furyl)-5-(2-morpholinoethoxy)-pyrimidine | 0.78 | 100 |

[1] Minimum inhibitory concentration.
[2] Inactive.

The toxicity of the compounds of this invention is minor.

The compounds can be employed in the treatment of trichomoniasis, especially when a superinfection by *Candida albicans* is present. The agent can be administered in the forms customarily employed in pharmaceuticals. For oral administration, especially suitable are tablets, dragées, capsules, pills, suspensions and solutions. Suitable excipients for tablets are, for example, lactose, amylose, talc, gelatin, magnesium stearate, etc.

For topical administration, suitable are powders, solutions, suspensions, aerosols, and vaginal suppositories. For parenteral application, aqueous and oily solutions or suspensions can be employed.

The compounds of this invention are formulated so as to provide, for example, 0.1–0.5 g. of the effective agent in admixture with 0.1 to 5 g. of a pharmacologically indifferent excipient, i.e., a pharmaceutically acceptable carrier, per unit dosage, e.g., per tablet.

The novel effective agents are usually administered in amounts of between 0.1 and 2.0 g. per patient per day.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

(a) 2-(2-furyl)-5-(2-dimethylaminoethoxy)-pyrimidine 10 g. of 2-(2-furyl)-5-(2-chloroethoxy)-pyrimidine is heated in 50 ml. of 40% aqueous dimethylamine solution and 10 ml. of ethanol for 4 hours to 70–80° C. Excess amine and ethanol are distilled off, and the residue is mixed with 50 ml. of water and shaken out with methylene chloride. The methylene chloride solution is dried with $K_2CO_3$ and evaporated, thus obtaining 6 g. of 2-furyl-5-(2-dimethylaminoethoxy)-pyrimidine, M.P. 81–83° C.

(b) 2-(5-nitro-2-furyl)-5-(2-dimethylaminoethoxy)-pyrimidine 6 g. of 2-(2-furyl)-5-(2-dimethylaminoethoxy)-pyrimidine is dissolved, under cooling, in 30 ml. of concentrated sulfuric acid, and at 5° C., 1.85 ml. of concentrated nitric acid (sp. gr. 1.48) is added dropwise. The reaction mixture is agitated for 30 minutes, poured on ice, the aqueous solution is neutralized with concentrated ammonia solution, the insoluble product is filtered off and recrystallized from ethanol. Melting point: 147–148° C. Yield: 2.7 g.

EXAMPLE 2

(a) 2-(2-furyl)-5-(2-diethylaminoethoxy)-pyrimidine 7.85 g. of 2-(2-furyl)-5-(2-chloroethoxy)-pyrimidine and 10.42 g. of diethylamine are heated in 80 ml. of ethanol for 18 hours to 70–80° C. The working up process is conducted analogously to Example 1(a), thus obtaining 5.1 g. of 2-furyl-5-(2-diethylaminoethoxy)-pyrimidine, M.P. 47–49° C.

(b) 2-(5-nitro-2-furyl)-5-(2-diethylaminoethoxy)-pyrimidine

This compound is prepared analogously to Example 1(b) from 5.0 g. of 2 - (2 - furyl) - 5 - (2-diethylaminoethoxy)-pyrimidine. The product is recrystallized from ethanol and dried under a vacuum at 70° C. Yield: 2.4 g., M.P. 137–141° C.

EXAMPLE 3

(a) 2-(2-furyl)-5-(2-pyrrolidinoethoxy)-pyrimidine 7.0 g. of 2-(2-furyl)-5-(2-chloroethoxy)-pyrimidine is heated in 20 ml. of pyrrolidine to 50° C., and then allowed to stand overnight at room temperature. Excess pyrrolidine is distilled off under vacuum, and the residue is mixed with water and shaken out with methylene chloride. The methylene chloride solution is dried, concentrated by evaporation, and the residue is recrystallized from benzine/benzene 5:1 and dried under vacuum at 50° C. Yield: 6.7 g. of 2-(2-furyl)-5-(2-pyrrolidinoethoxy)-pyrimidine, M.P. 91–92° C.

(b) 2-(5-nitro-2-furyl)-5-(2-pyrrolidinoethoxy)-pyrimidine

This compound is produced analogously to Example 1(b) from 10.5 g. of 2-(2-furyl)-5-(2-pyrrolidinoethoxy)- pyrimidine. The product is recrystallized from ethanol. Yield: 5.0 g., M.P. 132° C.

EXAMPLE 4

2-(5-nitro-2-furyl)-5-(2-pyrrolidinoethoxy)-pyrimidine sulfate 2.59 g. of 2-(2-furyl)-5-(2-pyrrolidinoethoxy)-pyrimidine is dissolved in 10 ml. of concentrated sulfuric acid, and at 5° C., 0.8 ml. of concentrated nitric acid (sp. gr. 1.48) is added dropwise. The reaction mixture is then stirred for 15 minutes, poured on ice, and neutralized with potassium carbonate. The insoluble product is filtered off and recrystallized from ethanol/methyl glycol. Yield: 2.2 g., M.P. 165–167° C.

EXAMPLE 5

(a) 2-(2-furyl)-5-(2-piperidinoethoxy)-pyrimidine 10.0 g. of 2-(2-furyl)-5-(2-chloroethoxy)-pyrimidine is heated in 30 ml. of piperidine for 4 hours to 70–80° C. Excess piperidine is distilled off under vacuum, and the residue is mixed with water and cooled in an ice bath. The crystals are vacuum-filtered, dissolved in dilute hydrochloric acid, decolorized with activated charcoal, made alkaline with ammonia, and cooled in an ice bath. The crystalline product is vacuum-filtered, washed with water, and dried under vacuum at 60° C. Yield: 8.1 g., M.P. 91–92° C.

(b) 2-(5-nitro-2-furyl)-5-(2-piperidinoethoxy)-pyrimidine

This compound is prepared analogously to Example 1(b) from 8.1 g. of 2-(2-furyl)-5-(2-piperidinoethoxy)-pyrimidine. The product is recrystallized from ethanol and dried under vacuum at 80° C. Yield: 3.4 g., M.P. 135–136° C.

EXAMPLE 6

(a) 2-(2-furyl)-5-(2-hexamethyleniminoethoxy)-pyrimidine 9 g. of 2-(2-furyl)-5-(2-chloroethoxy)-pyrimidine is heated with 30 ml. of hexamethylenimine for 3 hours to 70° C. and thereafter allowed to stand overnight. The reaction mixture is worked up analogously to Example 5(a). Yield: 6.9 g. M.P. 78–79° C.

(b) 2-(5-nitro-2-furyl)-5-(2-hexamethyleniminoethoxy)-pyrimidine

This compound is prepared analogously to Example 1(b) from 6.9 g. of 2-(2-furyl)-5-(2-hexamethyleniminoethoxy)-pyrimidine. The product is recrystallized from ethanol, M.P. 134–136° C. Yield: 3.2 g.

EXAMPLE 7

2-(5-nitro-2-furyl)-5-(2-hexamethyleniminoethoxy)-pyrimidine sulfate

This compound is produced analogously to Example 4 from 6.9 g. of 2-(2-furyl)-5-(2-hexamethyleniminoethoxy)-pyrimidine. The product is recrystallized from ethanol, M.P. 151–153° C. Yield: 4.4 g.

EXAMPLE 8

(a) 2-(2-furyl)-5-[2-(4-methylpiperidino)-ethoxy]-pyrimidine 10 g. of 2-(2-furyl)-5-(2-chloroethoxy)-pyrimidine and 30 g. of 4-methylpiperidine are heated for 3 hours to 70° C. The reaction mixture is worked up analogously to Example 5(a). Yield: 9.6 g., M.P. 83–84° C.

(b) 2-(5-nitro-2-furyl)-5-[2-(4-methylpiperidino)-ethoxy]-pyrimidine

This compound is produced analogously to Example 1(b) from 9.6 g. of 2-(2-furyl)-5-[2-(4-methylpiperidino)-ethoxy]-pyrimidine. The product is recrystallized from ethanol and dried under vacuum at 70° C. Yield: 6.4 g., M.P. 144–145° C.

EXAMPLE 9

(a) 2-(2-furyl)-5-[2-(3-aza-bicyclo[3.2.2]nonan-3-yl)-ethoxy]-pyrimidine 6.7 g. of 2-(2-furyl)-5-(2-chloroethoxy)-pyrimidine is dissolved in 50 ml. of methyl glycol, 11.2 g. of 3-aza-bicyclo(3.2.2)nonane is added and the solution is heated for 18 hours to 100° C. The methyl glycol is distilled off under vacuum, the residue is mixed with 80 ml. of water, cooled, and the solid product filtered off. This product is dissolved in dilute HCl, decolorized with activated charcoal, and precipitated with ammonia. The product is filtered off, dried at 60° C. under vacuum, and recrystallized from benzine/benzene 8:2. Yield: 6.5 g., M.P. 109–112° C.

(b) 2-(5-nitro-2-furyl)-5-[2-(3-aza-bicyclo[3.2.2]nonan-3-yl)-ethoxy]-pyrimidine sulfate The compound is produced analogously to Example 4 from 6.5 g. of 2-(2-furyl)-5-[2-(3-aza-bicyclo[3.2.2]nonan-3-yl)-ethoxy]-pyrimidine. The product is recrystallized from methanol/water 15:1 and dried at 80° C. under vacuum. Yield: 4.5 g., M.P. 158–163° C.

EXAMPLE 10

2-(5-nitro-2-furyl)-5-[2-(3-aza-bicyclo[3.2.2]nonan-3-yl)ethoxy]-pyrimidine 4.5 g. of 2-(5-nitro-2-furyl)-5-[2-(3-aza-bicyclo[3.2.2]nonan-3-yl)-ethoxy]-pyrimidine sulfate is suspended in 300 ml. of water and made alkaline with ammonia, under stirring. The solid product is vacuum-filtered, washed with water, recrystallized from 200 ml. of ethanol/methyl glycol, and dried under vacuum at 80° C. Yield: 2.7 g., M.P. 164° C.

EXAMPLE 11

2-(5-nitro-2-furyl)-5-[2-(3-aza-bicyclo[3.2.2]nonan 3-yl)-ethoxy]-pyrimidine hydrochloride 0.5 g. of 2-(5-nitro-2-furyl)-5-[2-(3-aza-bicyclo[3.2.2]nonan-3-yl)-ethoxy]-pyrimidine is dissolved, under heating, in 30 ml. of ethanol, an excess of ethanolic hydrochloric acid is added thereto and the reaction mixture is evaporated under a vacuum. The residue is recrystallized from methanol. Yield: 0.35 g., M.P. 232° C. (decomposition).

EXAMPLE 12

(a) 2-(2-furyl)-5-(2-morpholinoethoxy)-pyrimidine 10 g. of 2-(2-furyl)-5-(2-chloroethoxy)-pyrimidine and 30 g. of morpholine are heated for 5 hours to 70–80° C. The reaction mixture is worked up analogously to Example 3(a). The product is recrystallized from benzene/petroleum ether 2:3 and dried at 50° C. under vacuum. Yield: 9.3 g., M.P. 94–95° C.

(b) 2-(5-nitro-2-furyl)-5-(2-morpholinoethoxy)-pyrimidine sulfate

This compound is prepared analogously to Example 4 from 9.3 g. of 2-(2-furyl)-5-(2-morpholinoethoxy)-pyrimidine. The product is recrystallized from methanol/water 9:1 and dried at 70° C. under vacuum. Yield: 6:8 g., M.P. 200–201° C.

EXAMPLE 13

(a) 2-(2-furyl)-5-(2-N-methylpiperazinoethoxy)-pyrimidine 9 g. of 2-(2-furyl)-5-(2-chloroethoxy)-pyrimidine and 20 g. of N-methylpiperazine are heated for 3 hours to 70° C. The reaction mixture is worked up analogously to Example 3(a). Yield: 7.5 g., M.P. 76–80° C.

(b) 2-(5-nitro-2-furyl)-5-(2-N-methylpiperazino-
ethoxy)-pyrimidine

This compound is produced analogously to Example 1(b) from 7.3 g. of 2-(2-furyl)-5-(2-N-methylpiperazino-ethoxy)-pyrimidine. The product is recrystallized from ethanol. Yield: 2.5 g., M.P. 144–145° C.

EXAMPLE 14

(a) 2-(2-furyl)-5-[2-(N-n-propylpiperazino)-
ethoxy]-pyrimidine 6.72 g. of 2-(2-furyl)-5-(2-chloroethoxy)-pyrimidine is dissolved in 70 ml. of methyl glycol, and 11.4 g. of N-n-propylpiperazine is added thereto. The reaction mixture is heated for 10 hours to 100° C., then diluted with 50 ml. of water, and shaken out with methylene chloride. The solution is dried with sodium sulfate, evaporated, and the residue is recrystallized from benzine/benzene. Yield: 5.0 g., M.P. 73–74° C.

(b) 2-(5-nitro-2-furyl)-5-[2-(N-n-propylpiperazino)-
ethoxy]-pyrimidine dihydrochloride This compound is produced analogously to Example 1(b) from 2.0 g. of 2-(2-furyl)-5-[2-(N-n-propyl-piperazino)-ethoxy]-pyrimidine. The nitrated product is dissolved in ethanol after drying, mixed with ethanolic hydrochloric acid, and concentrated by evaporation. The residue is recrystallized from methanol and dried under vacuum at 60° C. Yield: 0.6 g., M.P. 257° C. (decomposition).

EXAMPLE 15

(a) 2-(2-furyl)-5-[2-(N-hydroxyethylpiperazino)-
ethoxy]-pyrimidine 2.2 g. of 2-furyl-5-(2-chloroethoxy)-pyrimidine is boiled under reflux with 7.2 g. of N-hydroxyethylpiperazine in 30 ml. of ethanol for 48 hours. The reaction mixture is worked up analogously to Example 1(a). The product is recrystallized from carbon tetrachloride and dried under vacuum at 60° C. Yield: 2.5 g., M.P. 106–107° C.

(b) 2-(2-furyl)-5-[2-(N-acetoxyethylpiperazino)-
ethoxy]-pyrimidine 2.5 g. of 2-(2-furyl)-5-[2-(N-hydroxyethylpiperazino)-ethoxy]-pyrimidine is heated on a steam bath in 10 ml. of acetic anhydride and a small amount of concentrated sulfuric acid for 2 hours. The acetic anhydride is distilled off under vacuum. The residue is mixed with water, neutralized with NaHCO₃, and shaken out with methylene chloride. The methylene chloride solution is dried with Na₂SO₄, evaporated, and the residue is recrystallized from cyclohexane/toluene 9:1. Yield: 1.9 g., M.P. 60° C.

(c) 2-(5-nitro-2-furyl)-5-[2-(N-acetoxyethylpipera-
zino)-ethoxy]-pyrimidine dihydrochloride This compound is prepared analogously to Example 1(b) from 1.0 g. of 2-(2-furyl)-5-[2-(N-acetoxyethyl-piperazino)-ethoxy]-pyrimidine. The nitrated product is dissolved in isopropanol after drying, mixed with ethereal hydrochloric acid, and evaporated. The residue is recrystallized from methanol. Yield: 0.5 g., M.P. 225° C. (decomposition).

EXAMPLE 16

(a) 2-(2-furyl)-5-(2-p-toluenesulfonyloxyethoxy)-
pyrimidine 10.3 g. of 2-(2-furyl)-5-(2-hydroxyethoxy)-pyrimidine is dissolved in 100 ml. of pyridine and stirred with 9.53 g. of p-toluenesulfonyl chloride for 1.5 hours at room temperature, and then poured into 500 ml. of ice water; the solid product is filtered off, washed with water, dried at 60° C. under vacuum, and recrystallized from toluene. Yield: 8.6 g., M.P. 154–155.5° C.

(b) 2-(2-furyl)-5-(2-di-n-butylaminoethoxy)-
pyrimidine hydrochloride 2.08 g. of 2-(2-furyl) - 5 - (2 - p - toluenesulfonyloxy-ethoxy)-pyrimidine is boiled under reflux for 20 hours with 2.33 g. of di-n-butylamine in 60 ml. of ethanol. The reaction mixture is completely evaporated, the residue is taken up in methylene chloride and water; the methylene chloride solution is washed, dried over Na₂SO₄, and evaporated. The crude, uncrystallizable 2-(2-furyl)-5-(2-di-n-butylaminoethoxy)-pyrimidine is dissolved in isopropanol/ether and mixed with ethereal HCl. The 2-(2-furyl)-5-(2-di - n - butylaminoethoxy)-pyrimidine hydrochloride is vacuum-filtered, recrystallized from isopropanol, and dried at 70° C. under vacuum. Yield: 0.9 g., M.P. 168–173° C.

(c) 2-(5-nitro-2-furyl)-5-(2-di-n-butylamino-
ethoxy)-pyrimidine

This compound is produced analogously to Example 1 (b) from 0.9 g. of 2-(2-furyl)-5-(2-di-n-butylamino-ethoxy)-pyrimidine hydrochloride. The product is recrystallized from isopropanol/water. Yield: 0.4 g., M.P. 83–85° C.

EXAMPLE 17

(a) 2-(2-furyl)-5-(2-di-n-propylaminoethoxy)-
pyrimidine hydrochloride

This compound is produced analogously to Example 16(b) from 3.60 g. of 2-(2-furyl)-5-(2-p-toluenesulfonyl-oxyethoxy)-pyrimidine and 5.05 g. of di-n-propylamine. The thus-obtained product is recrystallized from isopropanol and dried at 80° C. under vacuum. Yield: 1.80 g., M.P. 190° C.

(b) 2-(5-nitro-2-furyl)-5-(2-di-n-propylamino-
ethoxy)-pyrimidine

This compound is prepared analogously to Example 1 (b) from 1.40 g. of 2-(2-furyl)-5-(2-di-n-propylamino-ethoxy)-pyrimidine hydrochloride. The product is recrystallized from ethanol. Yield: 0.63 g., M.P. 120–121° C.

EXAMPLE 18

(a) 2-(2-furyl)-5-[2-(4-acetoxypiperidino)-
ethoxy]-pyrimidine 3.60 g. of 2-(2-furyl)-5-(2-p-toluenesulfonyloxyeth-oxy)-pyrimidine and 3.03 g. of 4-hydroxypiperidine are boiled under reflux for 48 hours in 50 ml. of ethanol; then, the ethanol is distilled off, the residue is mixed with water, and shaken out with methylene chloride. The methylene chloride solution is dried over sodium sulfate and evaporated. The residue is dissolved in 20 ml. of acetic anhydride, mixed with 2 drops of concentrated sulfuric acid, and heated for 1 hour to 100° C. After cooling, a small amount of sodium acetate is added, the acetic anhydride is distilled off under a vacuum, the residue is mixed with water, and shaken out with methylene chloride. The methylene chloride solution is dried over sodium sulfate and evaporated. The residue is recrystallized from toluene/petroleum ether 1:1. Yield: 2.0 g., M.P. 88–89° C.

(b) 2-(5-nitro-2-furyl)-5-[2-(4-acetoxypiperidino)-
ethoxy]-pyrimidine 1.95 g. of 2-(2-furyl)-5-[2-(4-acetoxypiperidino)-eth-oxy]-pyrimidine is dissolved in 10 ml. of acetic anhydride and 0.70 ml. of concentrated sulfuric acid added thereto. At a temperature of 5° C., 0.71 ml. of concentrated nitric acid is added dropwise, and the reaction mixture is then stirred for one hour at this temperature, then poured on ice, and the aqueous solution is neutralized with solution of sodium hydroxide. The solid product is filtered off, washed with water, and recrystallized from ethanol. Yield: 1.05 g., M.P. 122–123° C.

EXAMPLE 19

2-(5-nitro-2-furyl)-5-[2-(4-hydroxypiperidino)-ethoxy]-pyrimidine 1.05 g. of 2-(5-nitro-2-furyl)-5-[2-(4-acetoxypiperidino)-ethoxy]-pyrimidine is boiled under reflux for 1.5 hours in 20 ml. of dilute hydrochloric acid (20%); the hydrochloric acid is distilled off, the residue is mixed with 15 ml. of water and made weakly alkaline with ammonia. The thus-obtained solid product is filtered off and recrystallized twice from ethanol. Yield: 0.42 g., M.P. 145–147° C.

EXAMPLE 20

(a) 2-furyl-5-[2-(2-acetoxymethylpiperidino)-ethoxy]-pyrimidine

This compound is produced analogously to Example 18 (a) from 3.6 g. of 2-(2-furyl)-5-(2-p-toluenesulfonyloxy-ethoxy)-pyrimidine and 0.34 g. of 2-hydroxymethylpiperidine. Upon evaporation of the methylene chloride solution, an oil is obtained which is further processed as such.

(b) 2-(5-nitro-2-furyl)-5-[2-(2-acetoxymethyl-piperidino)-ethoxy]-pyrimidine This compound is produced analogously to Example 18(b) from 3.0 g. of crude 2-furyl-5-[2-(2-acetoxymethyl-piperidino)-ethoxy]-pyrimidine. The product is recrystallized from ethanol. Yield: 0.74 g., M.P. 74.5–76° C.

EXAMPLE 21

2-(5-nitro-2-furyl)-5-[2-(2-hydroxymethyl-piperidino)-ethoxy]-pyrimidine

This compound is prepared analogously to Example 19 from 2.80 g. of 2-(5-nitro-2-furyl)-5-[2-(2-acetoxymethylpiperidino)-ethoxy]-pyrimidine. The product is recrystallized from ethanol; yield: 1.35 g., M.P. 137–138° C.

EXAMPLE 22

(a) 2-(2-furyl)-5-[2-(2-,2'-diacetoxydiethylamino)-ethoxy]-pyrimidine 3.6 g. of 2-(2-furyl)-5-(2-p-toluenesulfonyloxyethoxy)-pyrimidine and 3.15 g. of diethanolamine are reacted analogously to Example 18(a). The oily crude product is further processed as such. Yield: 3.0 g.

(b) 2-(5-nitro-2-furyl)-5-[2-(2,2'-dihydroxydiethyl-amino)-ethoxy]-pyrimidine 3.0 g. of crude 2-(2-furyl)-5-[2-(2,2'-diacetoxydiethyl-amino)-ethoxy]-pyrimidine is nitrated as described in Example 18(b). The oily crude product is extracted from the aqueous solution with methylene chloride, and the methylene chloride solution is dried with sodium sulfate and evaporated. The thus-remaining oily 2-(5-nitro-2-furyl)-5-[2-(2,2'-diacetoxy - diethylamino) - ethoxy]-pyrimidine is saponified analogously to Example 19. The product is recrystallized from water/methanol 9:1. Yield: 0.40 g., M.P. 135–139° C.

EXAMPLE 23

(a) 2-(2-furyl)-5-[2-(N-acetylpiperazino)-ethoxy]-pyrimidine

This compound is produced analogously to Example 16(b) from 2.08 g. of 2-(2-furyl)-5-(2-p-toluenesulfonyl-oxy-ethoxy)-pyrimidine and 3.84 g. of N-acetylpiperazine. The oily crude product is further processed as such.

(b) 2-(5-nitro-2-furyl)-5-[2-(N-acetylpiperazino)-ethoxy]-pyrimidine

This compound is produced analogously to Example 18(b) from 2.50 g. of crude 2-(2-furyl)-5-[2-(N-acetylpiperazino)-ethoxy]-pyrimidine. The product is recrystallized from isopropanol. Yield: 1.18 g., M.P. 156–158° C.

EXAMPLE 24

2-[2-(5-nitro-2-furyl)-5-pyrimidinyloxy]-ethyltrimethyl-ammonium iodide 1.15 g. of 2-(5-nitro-2-furyl)-5-(2-dimethylaminoethoxy)-pyrimidine is boiled under reflux for 5 hours in 40 ml. of methyl iodide. The reaction mixture is completely evaporated, and the residue is recrystallized from methanol. Yield: 0.31 g., M.P. 260° C. (under decomposition).

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula

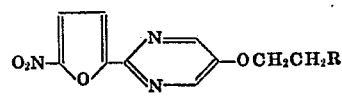

wherein R is an amino group selected from the group consisting of dialkylamino, di-hydroxyalkyl-amino, di-alkanoyloxy-alkyl-amino, pyrrolidino, piperidino, hexamethylenimino, piperazino, the corresponding cyclic amino groups substituted by alkyl, hydroxy, alkanoyloxy, alkanoyl, hydroxyalkyl, alkanoyloxyalkyl, wherein the alkyl and alkanoyl in each instance have 1–5 carbon atoms, inclusive, and pyrrolidino, piperidino and hexamethylenimino having a —(CH$_2$)$_2$— group joining two ring carbon atoms, physiologically acceptable acid addition or quaternary ammonium salts thereof.

2. A physiologically acceptable acid addition salt of claim 1.

3. A compound of claim 1 wherein R is dialkylamino or an acid addition salt thereof.

4. A compound of claim 1, 2-(5-nitro-2-furyl)-5-(2-dimethylaminoethoxy)-pyrimidine.

5. A compound of claim 1, 2-(5-nitro-2-furyl)-5-(2-diethylaminoethoxy)-pyrimidine.

6. A compound of claim 1, 2-(5-nitro-2-furyl)-5-(2-di-n-butylaminoethoxy)-pyrimidine.

7. A compound of claim 1, 2-(5-nitro-2-furyl)-5-(2-di-n-propylaminoethoxy)-pyrimidine.

8. A compound of claim 1 wherein R is pyrrolidino or an acid addition salt thereof.

9. A compound of claim 1, 2-(5-nitro-2-furyl)-5-(2-pyrrolidinoethoxy)-pyrimidine.

10. A salt of claim 1, 2-(5-nitro-2-furyl)-5-(2-pyrrolidinoethoxy)-pyrimidine sulfate.

11. A compound of claim 1 wherein R is piperidino or an acid addition salt thereof.

12. A compound of claim 1, 2-(5-nitro-2-furyl)-5-(2-piperidino-ethoxy)-pyrimidine.

13. A compound of claim 1, 2-(5-nitro-2-furyl)-5-[2-(4-methylpiperidino)-ethoxy]-pyrimidine.

14. A compound of claim 1, 2-(5-nitro-2-furyl)-5-[2-(4-acetoxy-piperidino)-ethoxy]-pyrimidine.

15. A compound of claim 1, 2-(5-nitro-2-furyl)-5-[2-(4-hydroxypiperidino)-ethoxy]-pyrimidine.

16. A compound of claim 1, 2-(5-nitro-2-furyl)-5-[2-(2-acetoxymethylpiperidinoethoxy]-pyrimidine.

17. A compound of claim 1, 2-(5-nitro-2-furyl)-5-[2-(2-hydroxymethylpiperidino)-ethoxy]-pyrimidine.

18. A compound of claim 1 wherein R is hexamethylenimino or an acid addition salt thereof.

19. A compound of claim 1, 2-(5-nitro-2-furyl)-5-(2-hexamethyleniminoethoxy)-pyrimidine.

20. A salt of claim 1, 2-(5-nitro-2-furyl)-5-(2-hexamethyleniminoethoxy)-pyrimidine sulfate.

21. A compound of claim 1 wherein R is 3-aza-bicyclo-(3.2.2)-nonan-3-yl or an acid addition salt thereof.

22. A salt of claim 1, 2-(5-nitro-2-furyl)-5-[2-(3-azabicyclo]3.2.2]nonan-3-yl)-ethoxy]-pyrimidine sulfate.

23. A compound of claim 1, 2-(5-nitro-2-furyl)-5-[2-(3-aza-bicyclo[3.2.2]nonan-3-yl-ethoxy]-pyrimidine.

24. A salt of claim 1, 2-(5-nitro-2-furyl)-5-[2-(3-azabicyclo[3.2.2]nonan-3-yl)-ethoxy]-pyrimidine hydrochloride.

25. A compound of claim 1 wherein R is unsubstituted piperazino or piperazino substituted at the 4-position by alkyl, hydroxyalkyl or alkanoyloxyalkyl wherein alkanoyl and alkyl in each instance contains 1–5 carbon atoms, or an acid addition salt thereof.

26. A compound of claim 1, 2-(5-nitro-2-furyl)-5-(2-N-methylpiperazinoethoxy)-pyrimidine.

27. A salt of claim 1, 2-(5-nitro-2-furyl)-5-[2-(N-n-propylpiperazino)-ethoxy]-pyrimidine dihydrochloride.

28. A salt of claim 1, 2-(5-nitro-2-furyl)-5-[2-(N-acetoxyethylpiperazino)-ethoxy]-pyrimidine dihydrochloride.

29. A compound of claim 1, 2-(5-nitro-2-furyl)-5-[2-(N-acetylpiperazino)-ethoxy]-pyrimidine.

30. A compound of claim 1 wherein R is dihydroxyalkylamino or an acid addition salt thereof.

31. A compound of claim 1, 2-(5-nitro-2-furyl)-5-[2-(2,2'-dihydroxydiethylamino)-ethoxy]-pyrimidine.

32. A quaternary ammonium salt of claim 1.

33. A salt of claim 1, 2-[2-(5-nitro-2-furyl)-5-pyrimidinyloxy]-ethyl-trimethyl-ammoniumiodide.

References Cited

UNITED STATES PATENTS

| | | | |
|---|---|---|---|
| 3,299,090 | 1/1967 | Hoff et al. | 260—309 |
| 3,317,538 | 5/1967 | Freed et al. | 260—268 |
| 3,483,212 | 12/1969 | Miller | 260—309 |

OTHER REFERENCES

Gutsche et al., Chemical Abstracts, vol. 71, p. 301, 38992 (1969), effective date 1968.

ALEX MAZEL, Primary Examiner

J. TOVAR, Assistant Examiner

U.S. Cl. X.R.

260—247.5 R; 424—251

UNITED STATES PATENT OFFICE
CERTIFICATE OF CORRECTION

Patent No. 3,707,485      Dated December 26, 1972

Inventor(s) Klaus Gutsche et al

It is certified that error appears in the above-identified patent and that said Letters Patent are hereby corrected as shown below:

<u>Column 1, in the Heading</u>: "Hans-Joachim Kebler" should be --Hans-Joachim Kessler--.

<u>Column 1, line 41</u>: "trichomonades" should be --trichomonads--.

<u>Column 7, line 62 of Example 15</u>: "0.5 g.," should be --0.6 g.,--

Signed and sealed this 17th day of September 1974.

(SEAL)
Attest:

McCOY M. GIBSON JR.
Attesting Officer

C. MARSHALL DANN
Commissioner of Patents